United States Patent Office 3,500,983
Patented Mar. 17, 1970

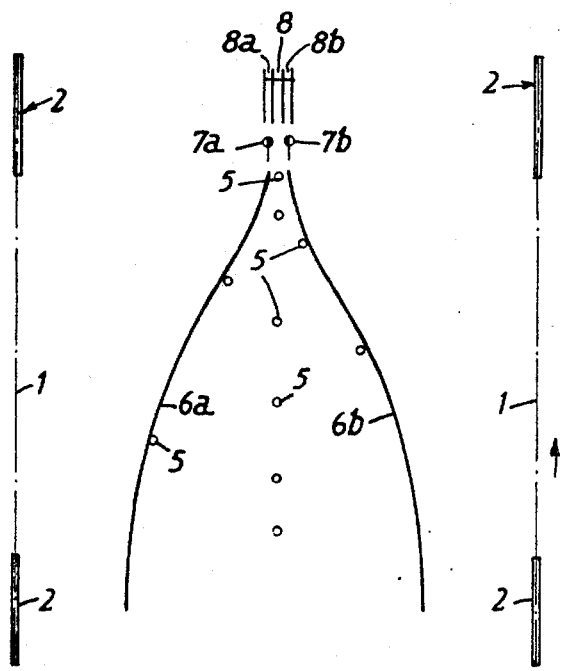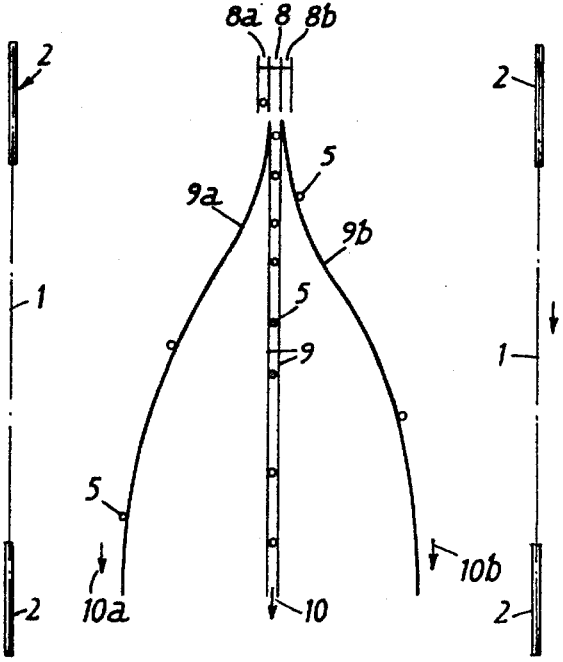

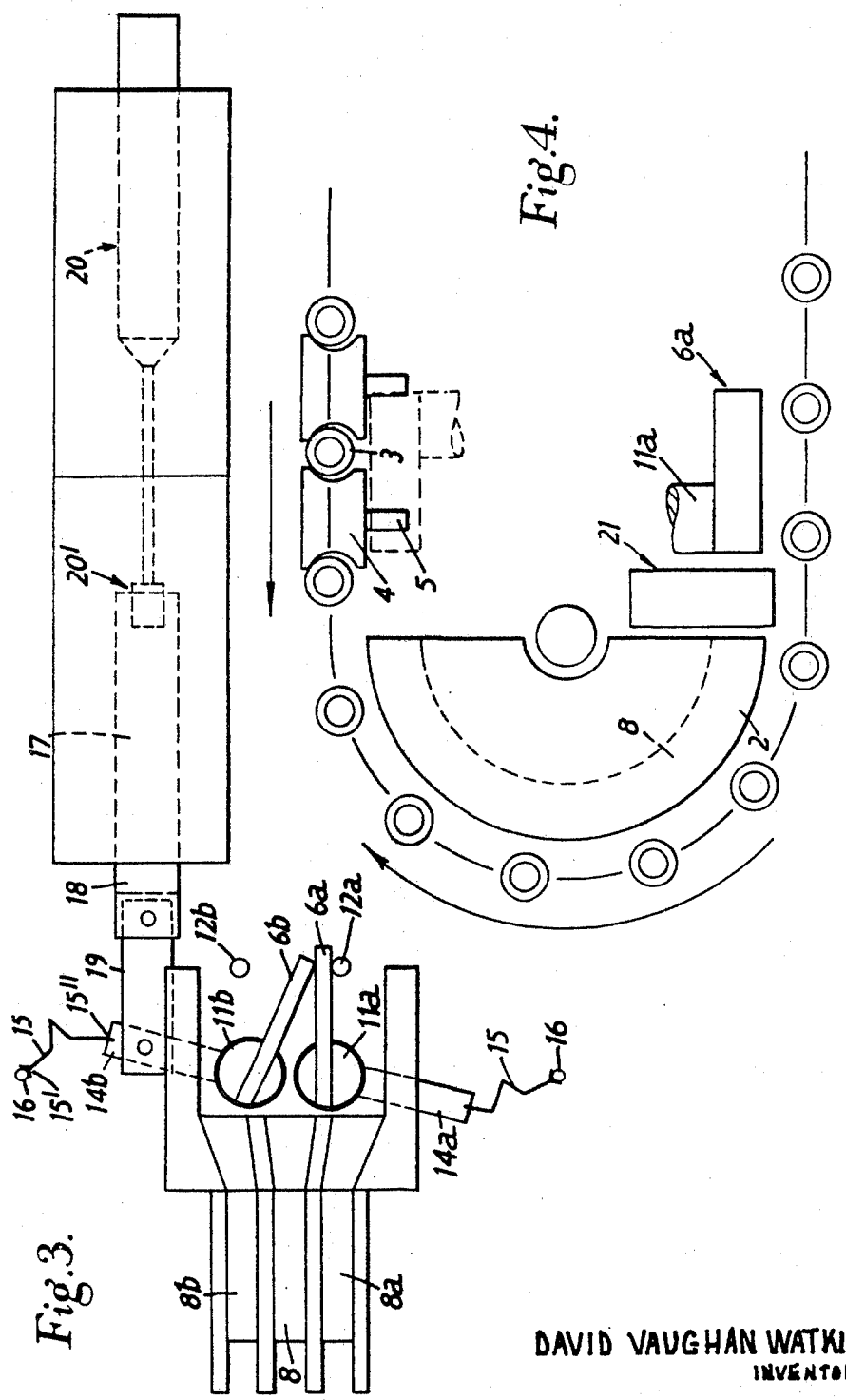

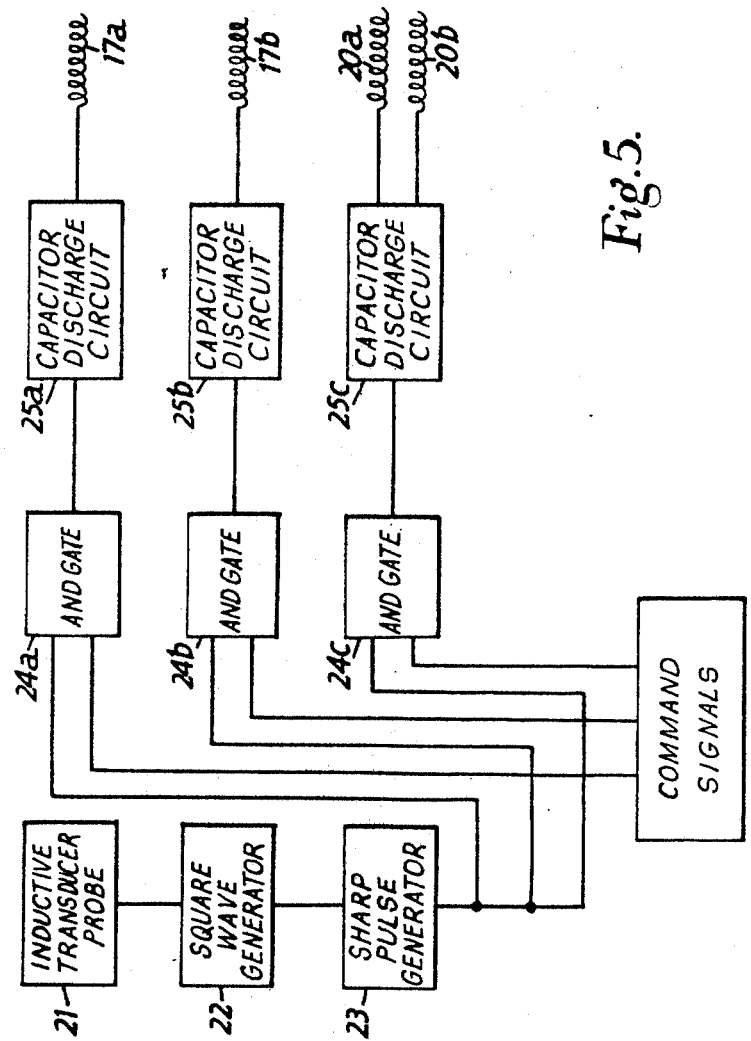

3,500,983
LINE DIVIDING CONVEYOR
David Vaughan Watkins, 66 Bedford Gardens,
London, W. 8, England
Filed Oct. 16, 1967, Ser. No. 675,637
Claims priority, application Great Britain, Oct. 18, 1966,
46,622/66
Int. Cl. B65g 47/26
U.S. Cl. 198—31                                    4 Claims

ABSTRACT OF THE DISCLOSURE

A line dividing conveyor comprises a plurality of slides held between flight bars connecting a pair of parallel drive chains, the slides being much shorter than the flight bars and having projection pins for engagement with stationary guides, which can deflect the path of forward movement of the slides and the packages carried thereby.

Selected slides are engaged with the stationary guides by the action of latching levers which may be snapped between alternate positions of stability in which they respectively obstruct or permit the passage of the slide pins. The latching levers are actuated by push-pull solenoid units and are provided with over-centre springs. The operation of the solenoids is preferably effected by capacitor discharge circuits which are fired in response to a command signal from an external source and a timing signal, produced by the interaction of the flight bars of the conveyor and an inductive transducer.

The present invention relates to a line dividing conveyor. In many circumstances it is desirable to divide a line of articles travelling on a conveyor into two or three lines of articles.

Where the output rate of a filling or wrapping machine utilised for packaging purposes is greater than the maximum rate of operation of the available machinery for carrying out a subsequent operation, it may be desirable for the purpose of taking full advantage of the filling or wrapping machine to employ a line dividing conveyor so that the line of articles in the form of packages issuing from the machine may be divided into two or three separate lines for feeding into other machines of lower rate. In such case the function of the line dividing conveyor is to divide the line of packages or articles issuing from the first machine into two or three lines in each of which there is a substantially equal number of packages or articles.

It is already well known to employ a line dividing conveyor as an output conveyor from a check weighing apparatus to serve as the means for rejecting articles falling outside the weight limits of the check weigher. In such case the line dividing conveyor is empolyed to divide the line of packages from the conveyor either into two lines comprising respectively underweight packages, correct weight packages and overweight packages.

A line dividing conveyor for either of these purposes commonly comprises a pair of parallel chains, connected to each other by cross bars. Slide members are carried between the cross bars and form the working surface of the conveyor. These slides are of lesser length than the lateral spacing between the carrier chains and thus movement of the slide members in a lateral direction in relation to the conveyor movement may be utilised as a means for dividing the line of articles carried on the conveyor. Depending on whether means are provided for diverting individual slide members in one or both lateral directions from a normal central position the conveyor may be utilised for dividing a single line of articles into two or three lines of articles which are progressed forward by the conveyor.

In known arrangements employed in conjunction with a check weighing machine the lateral movement of the slides is initiated by a reject signal from the weighing scale whenever the weight of the article weighed falls outside the accepted limits. When the article weighed is within the accepted limits the slide members remain in a normal central position to which all slide members are returned during the return run of the conveyor. In the known line dividing conveyors employed with check weighing machines the slides each have a pin on their undersurface, which co-operate with a latching member to move them sideways from their normal path by a distance sufficient to engage them with a ramp or rail which completes their sideways movement as they are carried forward by the support chains. On the return run of the conveyor the pins on displaced slides encounter inclined rails which re-direct them towards their central position, so that each of the slides is correctly centered in relation to the conveyor before reaching the point at which the articles reach the conveyor from the weighing scales of the check weighing apparatus.

As the operating rate of check weighing apparatus or other machine from which articles are fed onto the conveyor is increased it will be understood that the speed of the line dividing conveyor has likewise to be increased and the number of slide pins passing the latching mechanism in a given time is increased, so that considerable difficulties are encountered in avoiding the occurrence of jamming of the slide pins with the latching mechanism. The latching mechanism normally takes the form of an inclined plate or ramp which is moved into the path of the oncoming slide or slides supporting an article to be diverted from the central path of the conveyor and the principal danger is that the latching mechanism may be encountered end-on by a slide pin, which may result in complete jamming of the conveyor.

It will be understood that the end of the plate or ramp of the latching mechanism must be of substantial thickness to have the strength necessary to impart the lateral acceleration of the slide member and also in some cases the article supported thereby. In order to overcome this difficulty it is necessary to provide means for operating the latching mechanism at a precisely determined instant and to move it in and out of its operative position well within the time interval between successive slide pins. It is an object of the present invention to provide means for operating the latching mechanism of the known line-dividing conveyor in such a manner.

It will be understood that the line-dividing output conveyor employed with a check weighing machine for package rejection is provided with an outwardly diverging stationary guide rail on one or both sides of the normal path of the slide member pins at a distance from such path just sufficient to permit the passage of an undisplaced slide. The leading end of the guide rail or rails is arranged to pick up the pin on a slide member which has been laterally displaced by the latching mechanism in the appropriate direction and the camming action of the guide. It is usually preferred to provide latching mechanism in such a way that an underweight article is displaced to one side of the conveyor and an overweight article to the other side of the conveyor, but it is possible to arrange that both underweight and overweight articles are displaced to the same side. In the former instance two latching mechanisms are employed, responding respectively to underweight and overweight signals from the weighing scale, whereas in the latter case a single latching device may be employed, responding to both underweight and overweight signals. It will be understood similarly that when the conveyor is used for simple line dividing purposes one or two latching mechanisms are employed, depending upon whether it is desired to divide the product line issuing from a machine into two or three lines.

In accordance with the present invention a line dividing conveyor comprises a pair of laterally spaced drive chains, connected by cross members arranged at equal intervals, slide members arranged between and supported by adjacent cross members, the length of such slide members being less than the lateral spacing between the drive chains, each slide member having a projecting formation on its reverse surface, latching means for engaging said projecting formation to impart an initial lateral diverting movement to a selected slide member, stationary guide means associated with the upper run of the conveyor for engagement with the projecting formation of a diverted slide member to complete the lateral movement of such slide member, stationary guide means associated with the return run of the conveyor for engagement with the projecting formation of a diverted slide member for returning said slide member to a central position, the latching means for movement of the slide members in one lateral direction comprising a lever, pivoted about an axis substantially vertical to the plane of the adjacent run of the conveyor, one arm of the lever being movable between two stable positions in which it respectively obstructs or passes the projecting formations on the slide members, the lever being urged towards one of its stable positions by a spring, providing two positions of stability, the other arm of the lever being acted on by a push-pull solenoid arrangement actuated in response to current pulses, generated at defined instants in relation to the conveyor movement.

It will be understood that when it is desired to direct the slide members in two lateral directions two latching levers are provided respectively arranged so as to be, when in their passing position, on opposite sides of the path followed by the slide member projecting formations.

Whilst an over-centre spring may be used for loading the lever, it is preferred to use bistable leaf springs.

In a preferred arrangement a push type solenoid operates on the plunger of a pull solenoid for the displacement of the lever to bring its arm into a pin engaging position. The pull solenoid is employed for returning the lever to the pin-passing position. The actuation of both solenoids is effected by a short current pulse, preferably of about 20 milliseconds duration, derived from a capacitor discharge circuit. It is in fact possible by this means to move the lever arm between its extreme positions in a time interval of about 5 milliseconds. The jam-free operation of the conveyor depends upon very precise timing of the firing of the capacitor discharge circuit.

Referring now to the accompanying drawings:

FIGURE 1 shows in a diagrammatic form the guides for the slide members on the return run of the conveyor, FIGURE 2 shows in diagrammatic form the guides for the slide members on the outgoing run of the conveyor, FIGURE 3 is a plan view of the latching mechanism, FIGURE 4 is a side view of the ingoing end of the conveyor, FIGURE 5 is a block diagram of the circuit controlling the operation of the push-pull solenoids.

The mechanical construction of the conveyor is generally known. The conveyor is comprised by a pair of laterally spaced drive chains 1, supported by end sprockets 2. The drive chains 1 are of the extended bush type, so that they may support a series of stainless steel tubes 3 arranged at equal intervals. Between adjacent tubes 3 are arranged plastic slide members 4, each having a guide pin 5 on its reverse face. The plastic slide members 5 have a length approximately equal to one third the length of the tubes 3.

Referring to FIGURES 1 and 2, it will be seen that in FIGURE 1 the guide pins 5 of the slide members 4, which are omitted in this view, but are in an inverted position, enter the wide gap between the leading ends of the centralising guides 6a, 6b, so that all laterally displaced slides are returned to a normal central position before reaching the outgoing ends of the guides 6a, 6b which are at this point spaced apart by a distance only slightly in excess of the diameter of the pins 5. As indicated in FIGURE 1 the latching levers 7a, 7b are positioned adjacent the ends of the guides 6 and are arranged either to permit the pins to pass into a central guide channel 8 or to switch the pins into the guide channels 8a, 8b. When the pin 5 remains in the central guide channel it is carried round to engage in the channel between a pair of central guide rails 9 beneath the upper run of the conveyor (FIGURE 2). When the pin 5 is diverted into the channels 8a or 8b, it meets the outer surface of the guide rails 9a or 9b and the slide member, to which the pin is attached is progressively moved laterally by the camming action of the guide rail. As a result articles delivered to the ingoing end of the top run of the conveyor may be delivered at the outgoing end of the conveyor at one of the positions indicated by the arrows 10, 10a, 10b.

The novel latching mechanism is preferably located at the position shown in FIGURES 1 and 2 and in full lines in FIGURE 4, although it may occupy the alternative position indicated in chain lines in FIGURE 4. The preferred position is more suitable because at that position the slide members are unloaded whereas at the alternative position at the ingoing end of the upper run of the conveyor they are subject to the additional weight of the supported articles so that the reaction on the lever arms 6a, 6b is greater.

Referring now to FIGURE 3, the switch lever arms 6a and 6b are shown in their alternative positions. The switch lever arms 6a and 6b are respectively secured to stout vertical spindles 11a and 11b mounted in suitable bearings (not shown).

The lever arms 6a and 6b co-operate with stop pins 12a and 12b which limit their angular movement. The spindles 11a and 11b are respectively provided with lever arms 14a and 14b. The arms 14a and 14b are acted on by bistable leaf springs 15. The leaf springs 15 each have a forked tail 15' to engage against a support pin 16 and a nose 15'' to engage in a small slot in the ends of the lever arms 14a, 14b.

The movement of the lever arms 6a and 6b between the alternative positions indicated in FIGURE 3 is effected by a push-pull solenoid unit (for convenience only the push-pull solenoid unit connected to lever arm 14b being shown in FIGURE 3). The push-pull solenoid comprises a pull solenoid 17, having a pull rod 18, which is pivotally connected to the arm 14b through a pivoted link 19, which is only free to turn through a small angle in relation to pull rod 18 so that thrust may be transmitted through it. The lever arm 6b can be swung back into the position corresponding to the position illustrated for lever arm 6a by the action of a push solenoid 20, which acts through a nylon wear plug 20' on the pull rod.

As explained above the operation of the line divider relies upon the actuation of the solenoids at precisely defined instants in relation to the longitudinal movement of the slide member pins, so that the switching action of the latching levers can be completed with certainty in the time interval between two slide pins. As already stated the solenoids can switch the lever members 6a, 6b between their two extreme positions in time intervals of the order of 5 milliseconds.

The actuation of the appropriate pull solenoid 17 to snap the selected latching lever 6a or 6b into the operative position to arrest the pin of a selected slide member 4 or the actuation of the push solenoid 20 to swing the levers 6a and 6b into the pass position is achieved by the discharge of a capacitor discharge circuit capable of producing a heavy current pulse of sufficient duration to pull the lever over centre in relation to the leaf spring 15. For convenience both push solenoids 20 are always fired together. The timing of the firing of the capacitor discharge circuit is achieved by deriving a firing pulse from the passage of the stainless steel tubes 3 past a fixed point. To this end a probe of an inductive transducer 21 is positioned close to the path of the tubes at a position somewhat displaced from the path of the chains 1 (e.g. a distance of one inch or more), so as to be affected as little as possible by the passage of the chains.

The passage of the ferrous metal tubes 3 induces current pulses of somewhat sinusoidal form in the inductive transducer, the passage of the non-metallic slides 4 not affecting the transducer. This current is converted into a square wave form in the network 22 in a manner well known and in turn in network 23 the pulse is narrowed to form a pulse of very short time duration. The output signal pulse is then fed into AND gate circuits 24a, 24b, 24c. A command signal is also fed to an appropriate AND gate. The command signal is of relatively long time duration with the consequence that a pulse appears in the output of the appropriate AND gate circuit in synchronism with the narrow pulse from the network 23 to fire the capacitor discharge circuit 25. This enables the appropriate lever 6a or 6b to be brought into the latching position or into the pass position at a precise instant in relation to the movement of the pins 5.

The command signal appearing in the AND gate would, where the line dividing conveyer is being used in conjunction with a check weigher, be a signal resulting from the presence of an overweight or underweight article on the weighing scale.

Where the apparatus is used as a simple line divider, so as to divide a line of articles on the conveyor to two or three lines, then the selection pulse generator signal may be derived from a switch sequentially actuated by the passage of articles past a fixed point, usually cutting a light beam drected at a photocell or cutting an ultrasonic beam.

Whilst it is preferable to derive the pulses for firing the capacitor discharge circuit from the passage of the flight tubes 3 past the inductive transducer probe, it is possible to place the probe close to one of the chain sprockets and induce current pulses therein by interaction of the transducer and the teeth of the sprocket wheel: in such case means must also be provided for blocking a proportion of such pulses so that firing pulses are transmitted to the AND gate only in synchronism with the passage of the flight tubes.

I claim:

1. A line dividing conveyor comprising a pair of laterally spaced drive chains, connected by cross members arranged at equal intervals, slide members arranged between and supported by adjacent cross members, the length of such slide members being less than the lateral spacing between the drive chains, each slide member having a projecting formation on its reverse surface, latching means for engaging said projecting formations to impart an initial lateral diverting movement to a selected slide member, stationary guide means associated with the upper run of the conveyor for engagement with the projecting formation of a diverted slide member to complete the lateral movement of such slide member, stationary guide means associated with the return run of the conveyor for engagement with the projecting formation of a diverted slide member for returning said slide member to a central position, the latching means for movement of the slide members in one lateral direction comprising a lever, pivoted about an axis substantially vertical to the plane of the adjacent run of the conveyor, one arm of the lever being movable between two stable positions in which it respectively obstructs or passes the projecting formations on the slide members, the lever being urged towards one of its stable positions by a spring, providing two positions of stability, push-pull solenoid means acting on the other arm of said lever, current pulse generating means electrically connected with said push-pull solenoid means for applying current pulses to said push-pull solenoid means, and means related to the movement of said conveyor for controlling said current pulse generating means and effecting generation of said pulses at a defined instant in relation to the conveyor movement.

2. A line dividing conveyor according to claim 1 wherein said spring is a leaf spring, having a central V-shaped portion and a pair of laterally extending terminal portions.

3. A line dividing conveyor according to claim 1 wherein said means for controlling comprises an inductive transducer.

4. A line dividing conveyor according to claim 3 in which said inductive transducer is positioned in close proximity to the path of the cross members connecting the drive chain, said cross members being composed of ferrous metal and said slide members being non-metallic whereby said current pulse is generated by the passage of each cross member past said inductive transducer.

References Cited

UNITED STATES PATENTS 3,129,803 4/1964 Giulie.
2,570,923 10/1951 Dodge.

RICHARD E. AEGERTER, Primary Examiner